(12) United States Patent
Zamani et al.

(10) Patent No.: US 9,998,274 B2
(45) Date of Patent: Jun. 12, 2018

(54) METHOD AND APPARATUS FOR ROBUST CLOCK RECOVERY IN COHERENT OPTICAL SYSTEMS

(71) Applicant: Huawei Technologies Co., Ltd., Shenzhen (CN)

(72) Inventors: Mahdi Zamani, Ottawa (CA); Mehdi Torbatian, Ottawa (CA); Jeebak Mitra, Ottawa (CA); Zhuhong Zhang, Ottawa (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/353,394

(22) Filed: Nov. 16, 2016

(65) Prior Publication Data
US 2018/0091288 A1 Mar. 29, 2018

Related U.S. Application Data

(63) Continuation of application No. PCT/CN2016/100002, filed on Sep. 24, 2016.

(51) Int. Cl.
*H04B 10/00* (2013.01)
*H04L 7/00* (2006.01)
*H04B 10/60* (2013.01)

(52) U.S. Cl.
CPC ........... *H04L 7/0075* (2013.01); *H04B 10/60* (2013.01)

(58) Field of Classification Search
USPC ................... 398/202–214, 154, 155
See application file for complete search history.

(56) References Cited

U.S. PATENT DOCUMENTS

| | | | | |
|---|---|---|---|---|
| 6,694,273 | B2 * | 2/2004 | Kurooka ............ | H04B 10/2513 702/66 |
| 7,123,845 | B2 * | 10/2006 | Matsuyama ....... | H04B 10/2513 398/202 |
| 7,680,418 | B2 * | 3/2010 | Tsuji ..................... | H04L 7/0075 375/355 |
| 7,941,054 | B2 * | 5/2011 | Tsuji ..................... | H04L 7/0075 398/154 |

(Continued)

FOREIGN PATENT DOCUMENTS

| | | |
|---|---|---|
| CN | 104170286 A | 11/2014 |
| CN | 105393487 A | 3/2016 |
| WO | 2014194940 A1 | 12/2014 |

*Primary Examiner* — Agustin Bello
(74) *Attorney, Agent, or Firm* — Slater Matsil, LLP

(57) ABSTRACT

An optical channel between a coherent optical transmitter and a coherent optical receiver may include one or more components that act as a bandpass filter with a passband that is narrower than the signal bandwidth. Such a narrow filter may significantly attenuate the signal content close to the band edge of the data signal. As a result, timing error detection may work less effectively, and therefore clock recovery may be less effective or fail. Methods and systems are disclosed in which a single optical carrier is used to transmit a data signal that has multiple bands, and timing error detection is performed at the receiver using one or more inner bands of the multiple bands. The timing error detection may therefore be made more robust to the effects of the narrow filtering.

20 Claims, 13 Drawing Sheets

(56) References Cited

U.S. PATENT DOCUMENTS

| | | | | |
|---|---|---|---|---|
| 8,005,370 B2* | 8/2011 | Perez | ............... | H04B 10/40 398/135 |
| 8,208,815 B1* | 6/2012 | Chiang | ............... | H04J 3/0682 398/155 |
| 8,655,191 B2* | 2/2014 | Kaneda | ............... | H04B 10/60 398/155 |
| 8,712,247 B2* | 4/2014 | Hauske | ............... | H04L 7/027 398/155 |
| 8,774,644 B2* | 7/2014 | Sun | ............... | H04B 10/6161 398/202 |
| 8,953,951 B1* | 2/2015 | Thomas | ............... | H04B 10/6161 398/202 |
| 8,971,701 B2* | 3/2015 | Adles | ............... | H04B 10/0795 398/155 |
| 8,989,593 B2* | 3/2015 | Sun | ............... | H04B 10/6161 398/155 |
| 9,350,450 B2 | 5/2016 | Chen et al. | | |
| 2002/0039211 A1* | 4/2002 | Shen | ............... | B82Y 15/00 398/9 |
| 2002/0123851 A1* | 9/2002 | Kurooka | ............... | H04B 10/2513 702/69 |
| 2004/0037572 A1* | 2/2004 | Matsuyama | ............... | H04B 10/2513 398/208 |
| 2009/0047030 A1* | 2/2009 | Hoshida | ............... | H04B 10/60 398/205 |
| 2010/0329697 A1* | 12/2010 | Koizumi | ............... | H03J 7/26 398/208 |
| 2011/0158658 A1* | 6/2011 | Myslinski | ............... | H04B 10/572 398/208 |
| 2011/0176815 A1* | 7/2011 | Frankel | ............... | H04B 10/5053 398/184 |
| 2011/0229127 A1* | 9/2011 | Sakamoto | ............... | H04B 10/60 398/25 |
| 2012/0177383 A1* | 7/2012 | Tanimura | ............... | H04B 10/61 398/158 |
| 2012/0213510 A1* | 8/2012 | Stojanovic | ............... | H04B 10/613 398/25 |
| 2013/0022351 A1 | 1/2013 | Arikawa | | |
| 2013/0039665 A1* | 2/2013 | Hauske | ............... | H04L 7/027 398/202 |
| 2013/0243420 A1 | 9/2013 | Li et al. | | |
| 2014/0099116 A1 | 4/2014 | Bai et al. | | |
| 2014/0270805 A1* | 9/2014 | Mani | ............... | H04J 3/0667 398/155 |
| 2015/0372762 A1 | 12/2015 | Zhang et al. | | |

* cited by examiner

METHOD AND APPARATUS FOR ROBUST CLOCK RECOVERY IN COHERENT OPTICAL SYSTEMS

CROSS-REFERENCE TO RELATED APPLICATIONS

This application is a Continuation of PCT Application No. PCT/CN2016/100002, filed on Sep. 24, 2016, which application is hereby incorporated herein by reference.

TECHNICAL FIELD

The present application relates to clock recovery in a coherent optical communication system.

BACKGROUND

In a coherent optical communication system, optical signals are used to carry data from a transmitter to a receiver. The channel between the transmitter and the receiver may introduce jitter into the data. Jitter refers to a variation in the delay of received data symbols. Because of impairments introduced by the channel, the delay between the received data symbols may vary, instead of remaining constant. Therefore, clock recovery may be performed at the receiver in order to generate a clocking signal such that the jitter is tracked and compensated for in the received signal. Clock recovery is also called timing recovery.

Clock recovery may be implemented using a phase locked loop at the receiver. To implement the phase locked loop, a timing error value is computed from the received signal. The timing error value may be used to correct for timing by providing an appropriately scaled correction signal to a voltage controlled oscillator (VCO) to try to ensure a correct frequency and a correction for the timing phase offset through digital techniques. Computing the timing error value is called performing timing error detection, and different methods for performing timing error detection are possible. One timing error detection method is the Godard method, which is disclosed in the following reference: Godard, D. (1978), Passband timing recovery in an all-digital modem receiver, IEEE Transactions on Communications, 26(5), 517-523. In the Godard method, timing error detection is performed using two narrow rectangular filters over frequencies $\pm f_B/2$, where $f_B$ is the baud rate. The baud rate is the transmission rate of the data symbols and is also called the symbol rate. The frequencies $\pm f_B/2$ are called the clock tones.

A signal carrying data symbols has a finite bandwidth. The excess bandwidth of the signal is the portion of the bandwidth having a frequency magnitude that exceeds $f_B/2$. Some timing error detection methods, such as the Godard method, make use of the excess bandwidth of the signal.

If the timing error detection method in the receiver becomes ineffective or fails, then clock recovery may fail.

SUMMARY

An optical channel between a coherent optical transmitter and a coherent optical receiver may include different optical components. One or more of the optical components may cause potentially severe low pass filtering with an effective filter bandwidth that is narrower than the signal bandwidth. The narrow filtering may significantly attenuate the excess bandwidth of a data signal, and possibly even the frequencies around the clock tones of the data signal. As a result, timing error detection may work less effectively, and therefore clock recovery may be less effective or fail.

Methods and systems are disclosed in which a single optical carrier transmits a data signal that has multiple bands. It may therefore be possible to make timing error detection at the receiver more robust by performing the timing error detection using one or more inner bands of the multiple bands. Any narrow filtering in the optical channel is more likely to attenuate or cut the outer bands of the data signal, but may not affect the inner bands as much. The timing error detection may therefore be better isolated from the effects of the narrow filtering.

In one embodiment, a coherent optical communication system is provided in which an optical transmitter sends a multi-band transmission on a single optical carrier. A method is performed at an optical receiver that may include converting the received optical signal on the single optical carrier into an electrical signal to obtain the received multi-band signal. The received multi-band signal has a plurality of frequency bands, including $k \geq 1$ inner frequency bands interposed between a first outer frequency band and a second outer frequency band. The method may further include separating the received multi-band signal into a plurality of signals. The plurality of signals include a first signal corresponding to the first outer frequency band, k signals each corresponding to a respective one of the k inner frequency bands, and a second signal corresponding to the second outer frequency band. The method may further include computing a timing error value for use in clock recovery by using at least one of the k signals.

An optical receiver to perform the method above is also disclosed.

BRIEF DESCRIPTION OF THE DRAWINGS

Embodiments will be described, by way of example only, with reference to the accompanying figures wherein.

DETAILED DESCRIPTION OF ILLUSTRATIVE EMBODIMENTS

For illustrative purposes, specific example embodiments will now be explained in greater detail below in conjunction with the figures.

Figure 1:
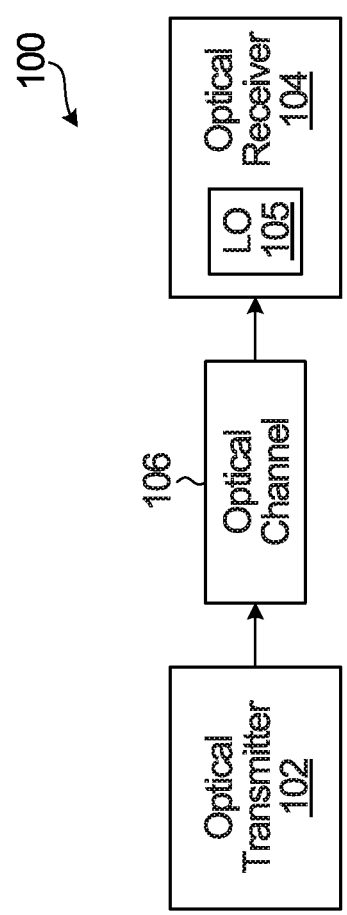
FIG. 1 is a block diagram of a coherent optical communication system, according to one embodiment.

FIG. 1 is a block diagram of a coherent optical communication system 100, according to one embodiment. The coherent optical communication system 100 includes an optical transmitter 102 and an optical receiver 104, connected by an optical channel 106. The optical receiver 104 is coherent and therefore receives a reference input signal from a local oscillator ("LO") 105. Although the LO 105 is illustrated as being within the optical receiver 104, in actual implementation the LO 105 may not be part of the integrated coherent receiver, but may instead feed into the integrated coherent receiver. During operation, data is transmitted from the optical transmitter 102 to the optical receiver 104 using optical signals to carry data. The optical signals propagate through the optical channel 106.

Figure 2:
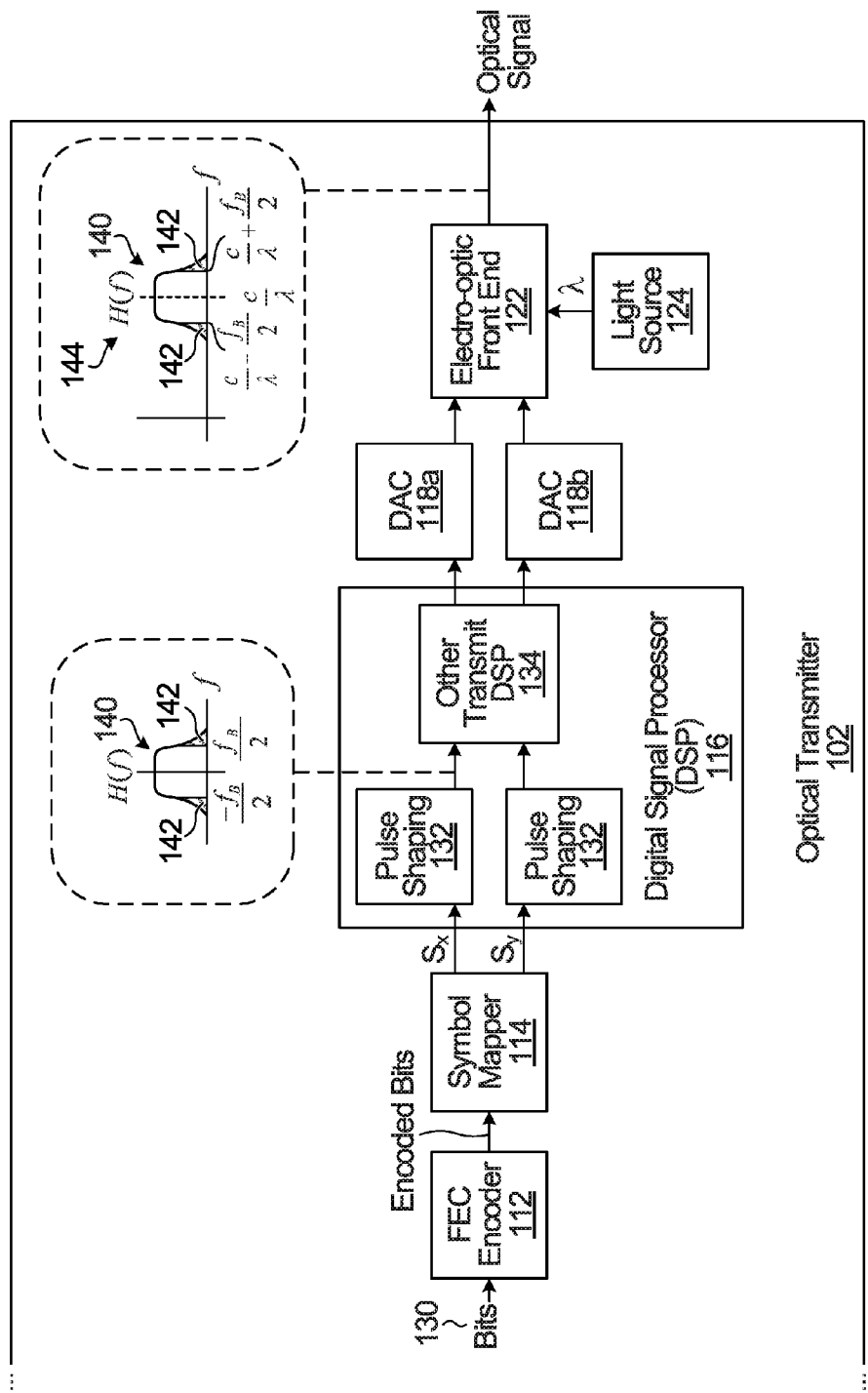
FIG. 2 is a block diagram of one example of an optical transmitter.

FIG. 2 is a block diagram of one example of the optical transmitter 102. The optical transmitter 102 includes a forward error correction (FEC) encoder 112, a symbol mapper 114, a digital signal processor (DSP) 116, digital-to-analog (DAC) converters 118a and 118b, an electro-optic front end 122, and a light source 124. The light source 124 may be implemented by a laser. The optical transmitter 102 may include other components, but these have been omitted for clarity.

The FEC encoder 112, symbol mapper 114, and DSP 116 may each be implemented by a processor that executes instructions that cause the processor to perform the operations of the FEC encoder 112, symbol mapper 114, and DSP 116. The same or different processor may be used to implement each of the FEC encoder 112, symbol mapper 114, and DSP 116. Alternatively, the FEC encoder 112, symbol mapper 114, and/or DSP 116 may be implemented using dedicated integrated circuitry, such as an application specific integrated circuit (ASIC), a graphics processing unit (GPU), or a programmed field programmable gate array (FPGA) for performing the functions of the FEC encoder 112, symbol mapper 114, and/or DSP 116. Example ways in which the DACs 118a and 118b may each be implemented include using a pulse-width modulator, a binary-weighted DAC, a switched resistor DAC containing a parallel resistor network, etc. The electro-optic front end 122 may be implemented using a linear driver, a Mach-Zehnder modulator, and an external laser source (i.e. light source 124).

During operation, data bits 130 to be transmitted are encoded using an error control code in the FEC encoder 112 to result in encoded bits. A dual-polarized system is assumed, and so the encoded bits are partitioned into two bit streams (not shown), and each bit stream is modulated by the symbol mapper 114 onto a respective data signal $S_x$ and $S_y$. The modulated data signal $S_x$ is to be transmitted on a first polarization of an optical signal, and the modulated data signal $S_y$ is to be transmitted on a second polarization of the optical signal. The modulated data signals $S_x$ and $S_y$ each carry data symbols mapped from the encoded bits using symbol mapper 114. For example, the symbol mapper 114 may implement quadrature phase shift keying (QPSK), in which case each data symbol represents two bits. Each modulated data signal $S_x$ and $S_y$ undergoes digital signal processing in the DSP 116. The digital signal processing includes pulse shaping 132, as well as other digital signal processing 134 for transmission, e.g. precoding, pre-compensation, I/Q and/or X/Y delay compensation, etc. After digital signal processing, the modulated data signals $S_x$ and $S_y$ are each converted to a respective analog signal using respective DACs 118a and 118b. The analog signals are then modulated onto an optical signal in the electro-optic front end 122. The data signal $S_x$ is modulated onto one polarization of the optical signal, and the data signal $S_y$ is modulated onto another polarization of the optical signal. The optical signal is produced by light source 124 and has a wavelength λ.

The frequency spectrum of data signal $S_x$, after pulse shaping 132, is illustrated at 140. The frequency spectrum 140 is a single band having clock tones at frequencies $\pm f_B/2$. The baud rate $f_B$ is determined by the targeted data rate and the constellation used for signal transmission. For example, if the data rate (including overhead) is 120 gigabits per second (Gbps), then data signals $S_x$ and $S_y$ each have a data rate of 60 Gbps. If QPSK is the modulation scheme, then each symbol carries two bits and so the baud rate $f_B$ of each of data signal $S_x$ and data signal $S_y$ is $f_B$=30 Gigabauds per second (GBdps). The frequency content having a magnitude greater than $f_B/2$ is the excess bandwidth, and is indicated at 142. The amount of excess bandwidth may be controlled by the roll-off factor of the filter used to perform the pulse shaping 132. The sharper the roll-off, i.e. the smaller the roll-off factor, the less excess bandwidth. The frequency band of data signal $S_y$ is not illustrated, but a similar discussion applies. The frequency spectrum after optical modulation is illustrated at 144. The signal is a bandpass signal centered at frequency c/λ, where c is the speed of light and λ is the wavelength of the optical signal on which the data signals $S_x$ and $S_y$ have been modulated. The optical signal has a single optical carrier of wavelength λ. Although not illustrated, the optical carrier may be multiplexed with other optical carriers of different wavelengths that carry different data, such as in a dense wavelength division multiplexing (DWDM) system.

Figure 3:
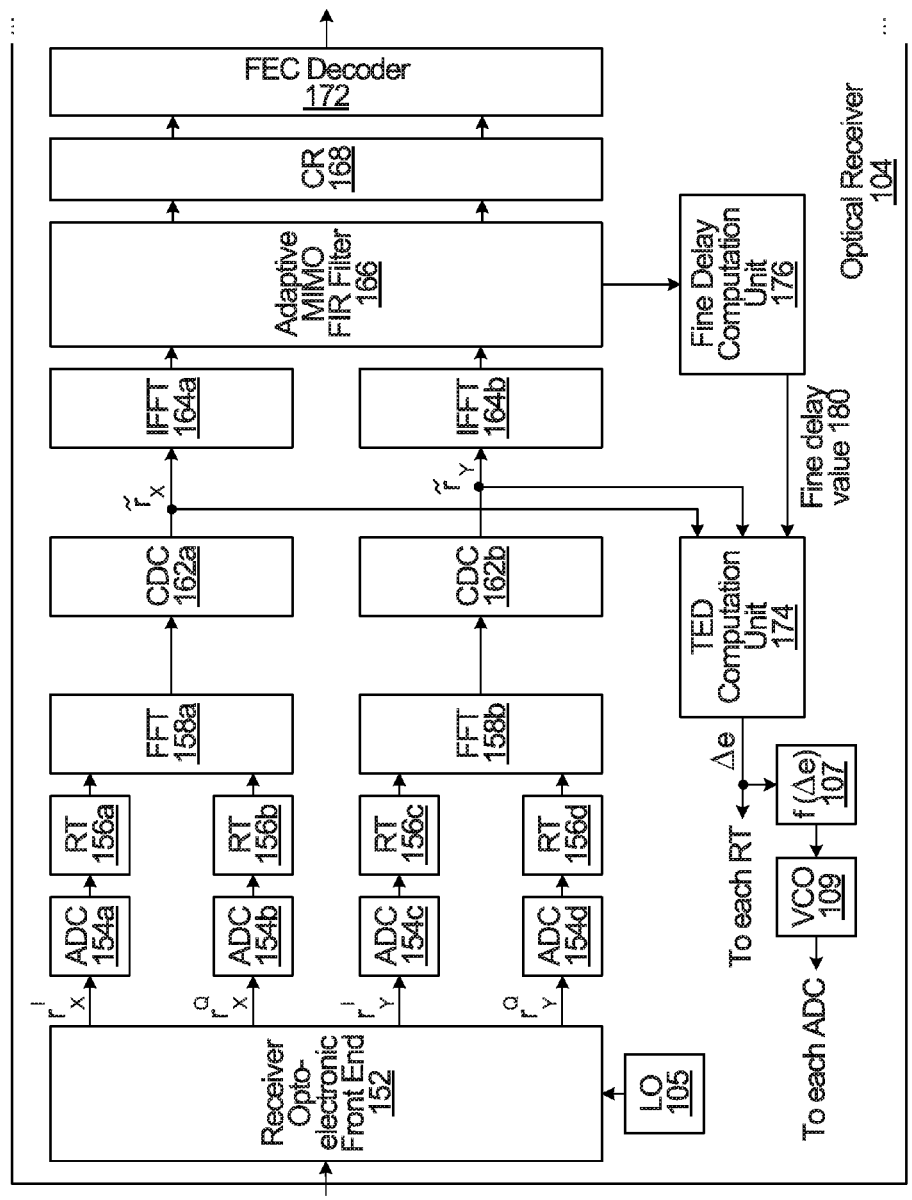
FIG. 3 is a block diagram of one example of an optical receiver.
Figure 4:
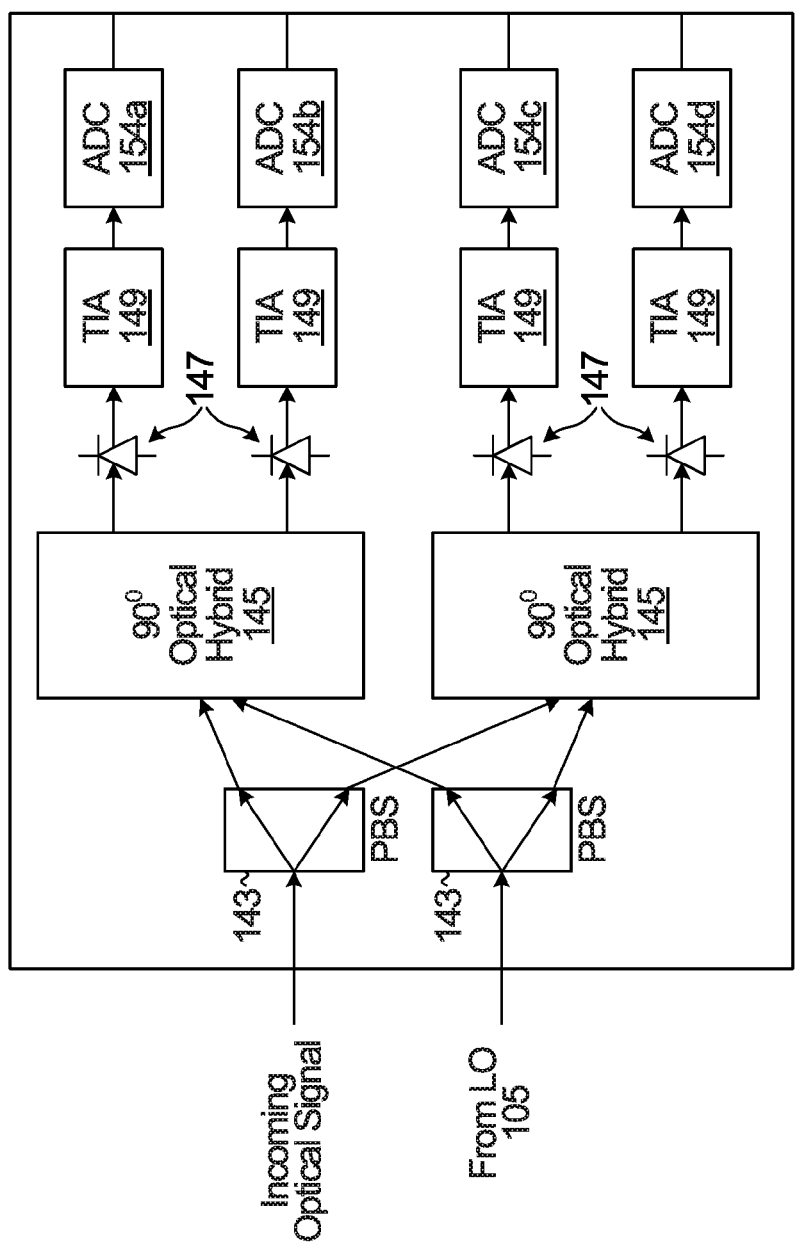
FIG. 4 illustrates one example of an opto-electronic front end.

FIG. 3 is a block diagram of one example of the optical receiver 104. The optical receiver 104 includes an opto-electronic front end 152 and analog-to-digital converters (ADCs) 154a to 154d. One example of the opto-electronic front end 152, including the ADCs 154a to 154d, is illustrated in FIG. 4. The opto-electronic front end 152 includes polarization beam-splitters 143 that respectively split the received optical signal and a reference optical signal (from LO 105) into X and Y polarizations. 90 degree optical hybrids 145, followed by photodetectors 147, process the output of the polarization beam-splitters 143 to provide in-phase (I) and quadrature-phase (Q) components for each of the mutually orthogonal received polarizations. Four transimpedance amplifiers 149 each respectively amplify the I and Q components of each polarization prior to analog-to-digital conversion. The ADCs 154a to 154d may each act as a sampler that periodically samples its input analog electrical signal. In some embodiments, comparators (not shown) may be used to implement each of the ADCs 154a to 154d.

Returning to FIG. 3, the optical receiver 104 further includes digital retiming modules (RTs) 156a to 156d, fast Fourier transform (FFT) blocks 158a and 158b, chromatic dispersion compensators (CDCs) 162a and 162b, inverse fast Fourier transform (IFFT) blocks 164a and 164b, adaptive multiple-input multiple output (MIMO) finite impulse response (FIR) filter 166, carrier recovery (CR) block 168, and FEC decoder 172. To perform timing error detection as part of implementing a phase locked loop for clock recovery, the optical receiver 104 includes a timing error detection (TED) computation unit 174 and a fine delay computation unit 176. The optical receiver 104 may include other components, but these have been omitted for clarity.

Each RT 156a to 156d is a retiming circuit comprising a digital interpolation module that corrects for timing offset determined by a timing error value. Each RT may therefore comprise a buffer that stores the received digital data samples and an interpolator that provides at its output the sampled data at the appropriately adjusted sampling instant based on the timing error value. The interpolator uses the timing error value to find an interpolated value of the signal at the corrected sampling instant, as dictated by the timing error value.

The FFT blocks 158a and 158b, the CDCs 162a and 162b, the IFFT blocks 164a and 164b, the adaptive MIMO FIR filter 166, the CR block 168, the FEC decoder 172, and the fine delay computation unit 176 may each be implemented by a processor that executes instructions that cause the processor to perform the operations of the FFT blocks 158a and 158b, the CDCs 162a and 162b, the IFFT blocks 164a and 164b, the adaptive MIMO FIR filter 166, the CR block 168, the FEC decoder 172, and the fine delay computation unit 176. The same or different processor may be used to implement each of the FFT blocks 158a and 158b, the CDCs 162a and 162b, the IFFT blocks 164a and 164b, the adaptive MIMO FIR filter 166, the CR block 168, the FEC decoder 172, and the fine delay computation unit 176. Alternatively, dedicated integrated circuitry, such as an ASIC, a GPU, or an FPGA may be used for implementing the functions of the FFT blocks 158a and 158b, the CDCs 162a and 162b, the IFFT blocks 164a and 164b, the adaptive MIMO FIR filter 166, the CR block 168, the FEC decoder 172, and/or the fine delay computation unit 176. Similarly, the interpolator in each RT 156a-d may be implemented by dedicated integrated circuitry, such as an ASIC, a GPU, or an FPGA, or by a processor that executes instructions. One example way to implement the TED computation unit 174 is the Godard method, and dedicated circuitry for this example implementation is described later in relation to FIG. 5. Different timing error detection methods are possible. Also, rather than using dedicated circuitry, the TED computation unit 174 may be implemented by a processor that executes instructions that cause the processor to perform the operations of the TED computation unit 174.

During operation, the received optical signal from the optical channel is converted by the opto-electronic front end 152 into four analog electrical signals: $r_X^I$, which corresponds to the in-phase (I) component of the X polarization; $r_X^Q$, which corresponds to the quadrature (Q) component of the X polarization; $r_Y^I$, which corresponds to the I component of the Y polarization; and $r_Y^Q$, which corresponds to the Q component of the Y polarization. Each one of the four signals $r_X^I$, $r_X^Q$, $r_Y^I$, and $r_Y^Q$ is respectively sampled using ADCs 154a to 154d. The output of each ADC 154a to 154d is sent to a respective RT 156a to 156d, which corrects for timing offset. Each FFT block 158a and 158b then transforms each of the time domain signals to frequency domain by implementing the FFT algorithm. Chromatic dispersion compensation is then applied in CDCs 162a and 162b. The output of CDCs 162a and 162b is then converted back into the time domain by IFFT blocks 164a and 164b. Each IFFT block 164a and 164b implements the IFFT algorithm. The signals output from the IFFT blocks 164a and 164b are then processed using the adaptive MIMO FIR filter 166 to compensate for other impairments, e.g. polarization mode dispersion (PMD). Carrier recovery for frequency and/or phase compensation is then performed by CR block 168.

The equalized symbol streams are then provided as inputs to the FEC decoder 172, which performs error detection and/or correction to result in a decoded bit stream.

Clock recovery is performed in the optical receiver 104 in order to sample the received signal at the correct instants by adequately compensating for jitter that may have been introduced in the transmitted signal due to various imperfections in the channel. The clock recovery is implemented in the optical receiver 104 using a phase locked loop. Specifically, the TED computation unit 174 generates a timing error value Δe based on the received values $\tilde{r}_X$ and $\tilde{r}_Y$ output from the CDCs 162a and 162b. The timing error value Δe is then used to adjust the frequency of a VCO 109 that is used to provide a clocking frequency to each of the ADCs 154a to 154d. The function block ƒ(Δe) 107 is to indicate that a modified version of the timing error value Δe (e.g. a scaled version of the timing error value Δe) may be used to adjust the frequency of the VCO 109. Function block ƒ(Δe) 107 is not illustrated in later figures, but may be present. The timing error value Δe is also used to adjust timing offset of the data sampled sequence in each RT block 156a-d. Although not shown in FIG. 3, a modified version of the timing error value Δe (e.g. a scaled version of the timing error value Δe) may be used to adjust timing offset of the data sampled sequence in each RT block 156a-d. As an example, in one embodiment the timing error value Δe may be multiplied by a scaling coefficient $\mu_2$, and then the timing offset in RTs 156a to 156d may be adjusted by an amount equal to or proportional to a lowpass filtered version of $\mu_2$Δe. The coefficient $\mu_2$ is to apply a small incremental correction, and the lowpass filter helps eliminate noise.

The timing error value Δe may also be computed based on the output of the fine delay computation unit 176, as shown in FIG. 3. The fine delay computation unit 176 may compute a finer or more precise delay value 180, which may then be used to adjust the error value Δe output by the TED computation unit 174. The fine delay computation unit 176 may be able to compute a finer or more precise delay value 180 because the computation is made downstream after the adaptive MIMO FIR filter 166, and so the received signal has fewer impairments compared to received signal values $\tilde{r}_X$ and $\tilde{r}_Y$ output from the CDCs 162a and 162b.

The fine delay value 180 is sometimes called a second stage timing error value. In one embodiment, the fine delay computation unit 176 computes and outputs the fine delay value 180 based on the filter tap values of the MIMO FIR filter 166. As one example, the fine delay computation unit 176 may compute the fine delay value 180 as follows: compute the discrete Fourier transform (DFT) of the coefficient matrix W representing the filter taps of the MIMO FIR filter 166, using the FFT algorithm, to obtain a frequency domain equivalent $\tilde{W}$; then compute the common linear phase of $\tilde{W}$ and output the value of the phase as the fine delay value 180. Other ways to compute the fine delay value 180 are also possible.

Figure 5:
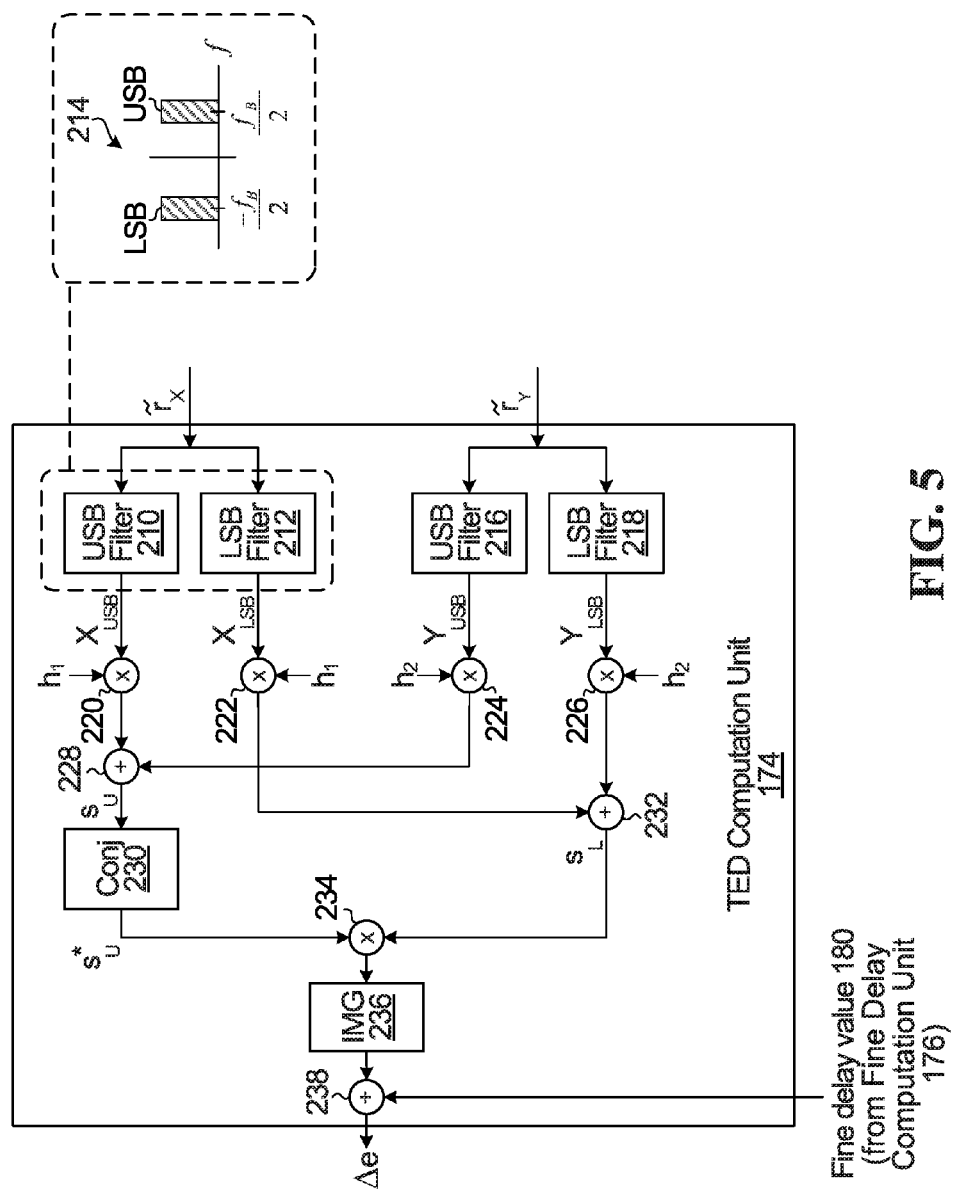
FIG. 5 illustrates an example implementation of a timing error detection (TED) computation unit.

FIG. 5 illustrates an example implementation of TED computation unit 174. The TED computation unit 174 illustrated in FIG. 5 implements the Godard method. The X component $\tilde{r}_X$ is filtered through both an upper-side-band (USB) filter 210 and a lower-side band (LSB) filter 212 to result in respective values $X_{USB}$ and $X_{LSB}$. The USB filter 210 and the LSB filter 212 implement a narrow rectangular filter around $\pm f_B/2$, as shown at 214. Similarly, the Y component $\tilde{r}_Y$ is filtered through USB filter 216 and LSB filter 218 to result in respective values $Y_{USB}$ and $Y_{LSB}$. $X_{USB}$ is multiplied by coefficient hot multiplier 220 to result in $h_1 X_{USB}$; $X_{LSB}$ is multiplied by coefficient $h_1$ multiplier 222 to result in $h_1 X_{LSB}$, $Y_{USB}$ is multiplied by coefficient $h_2$ at multiplier 224 to result in $h_2 Y_{USB}$, and $Y_{LSB}$ is multiplied by coefficient $h_2$ at multiplier 226 to result in $h_2 Y_{LSB}$. The coefficients $h_1$ and $h_2$ are obtained from a rough state-of-polarization (SOP) tracking that may be computed by the optical receiver 104 based on the chromatic dispersion compensated signal. $h_1 X_{USB}$ is added to $h_2 Y_{USB}$ at adder 228 to result in value $S_U$, and the conjugate of $S_U$ is computed (shown by block 230) to obtain $S^*_U$. $h_1 X_{LSB}$ is added to $h_2 Y_{LSB}$ at adder 232 to result in value $S_L$, and $S_L$ is multiplied with $S^*_U$ at multiplier 234 to obtain $S_L S^*_U$. The imaginary component of $S_L S^*_U$ is obtained (shown by block 236) and is adjusted by a filtered version of the fine delay value 180 from the fine delay computation unit 176, using adder 238, in order to result in timing error value Δe.

Figure 6:
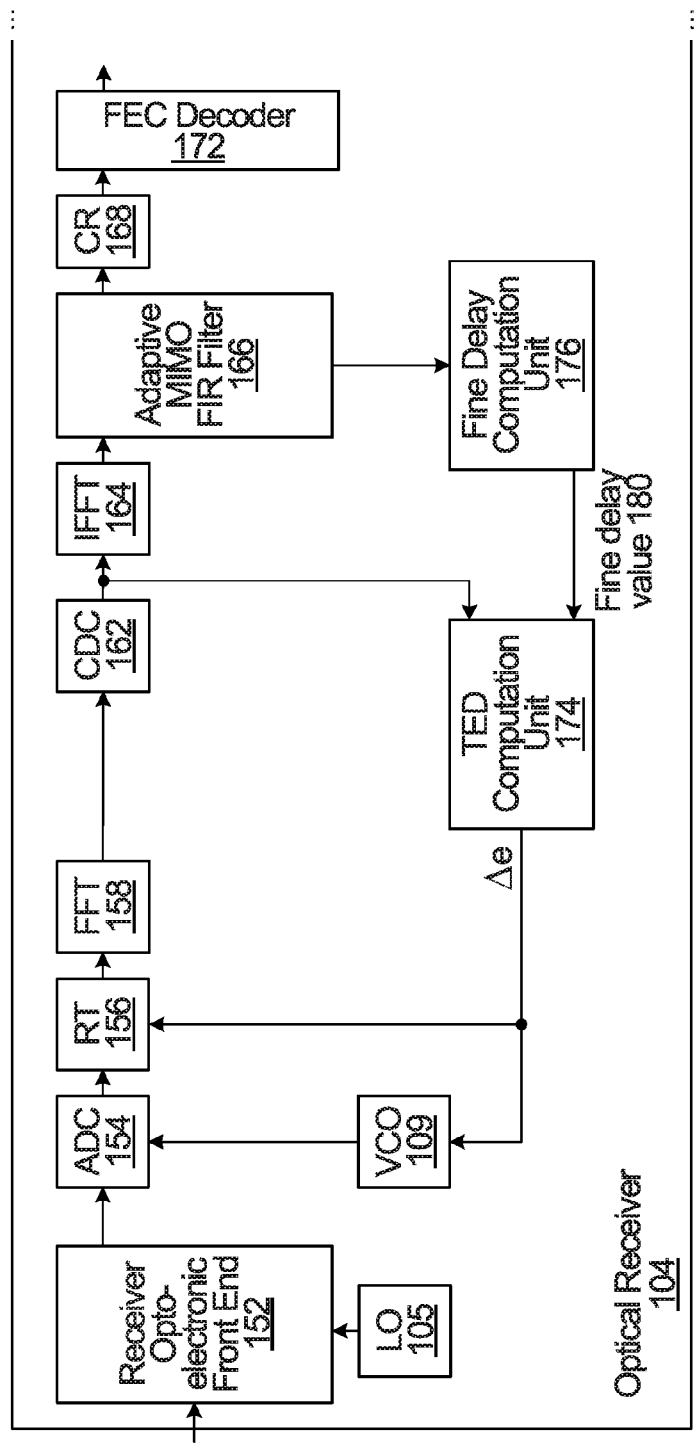
FIG. 6 illustrates the example optical receiver of FIG. 3, but using compact notation.

FIG. 6 illustrates the example optical receiver of FIG. 3, but using a compact representation. The multiple branches in FIG. 3 corresponding to the received mutually orthogonal I and Q components are shown as a single branch in FIG. 5. This compact representation will be used in the remaining figures.

As mentioned earlier, some timing error detection methods, such as the Godard method, use the excess bandwidth of the signal. Timing error detection methods that use the excess bandwidth (like the Godard method) may be more efficient and popular in coherent optical systems compared to timing error detection methods that do not use the excess bandwidth.

Figure 7:
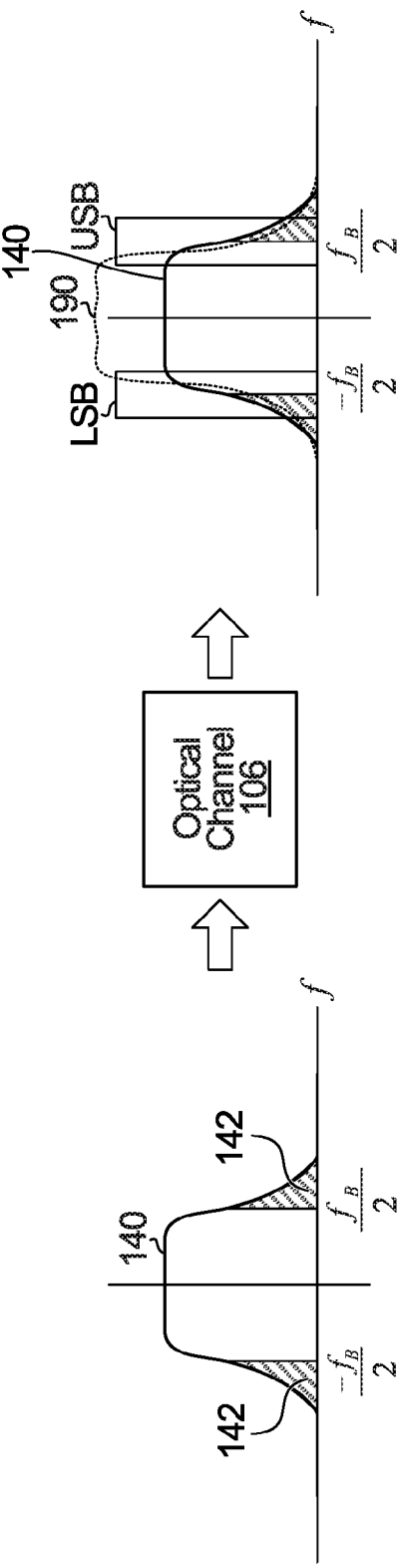
FIG. 7 illustrates the effect of a narrow filter on the frequency band of a data signal.

However, the optical channel between the transmitter and the receiver may include a narrow filter that significantly attenuates or "cuts" the excess bandwidth of the signal and maybe even the frequencies around the clock tones. For example, a wavelength selective switch (WSS) in an optical channel may act as a narrow bandpass filter. FIG. 7 illustrates the effect of a narrow filter on the frequency band of a data signal. On the left side of FIG. 7, the frequency spectrum 140 of data signal $S_x$ in the transmitter 102 is illustrated. This is the same frequency spectrum 140 illustrated and described above in relation to FIG. 2. The frequency spectrum 140 is a single band having clock tones at frequencies $\pm f_B/2$. The frequency content having a non-zero magnitude at frequencies greater than $f_B/2$ is the excess bandwidth and is indicated at 142. The right side of FIG. 7 illustrates the effect of a narrow filter on the frequency band. The frequency spectrum of the narrow filter is shown using stippled lines at 190. The narrow filter significantly attenuates all frequency components in the spectrum 140 having a frequency magnitude around and greater than $f_B/2$. The frequency spectrum of the USB and LSB filters applied during the Godard timing error detection method are also illustrated. The frequencies in the spectrum 140 filtered by the USB and LSB filters include those significantly attenuated by the narrow filter. The performance of the Godard timing error detection method is therefore adversely affected by the presence of such a filter.

The problem explained in relation to FIG. 7 may be mitigated when using a single optical carrier signal to transmit a data signal that has more than two bands. Timing error detection may then be performed using one or more inner bands of the multiple bands. Any narrow filtering in the optical channel 106 may attenuate or cut the outer bands of the data signal, but will typically not affect the inner bands as much. The timing error detection may then be better isolated from the effects of the narrow filtering.

Figure 8:
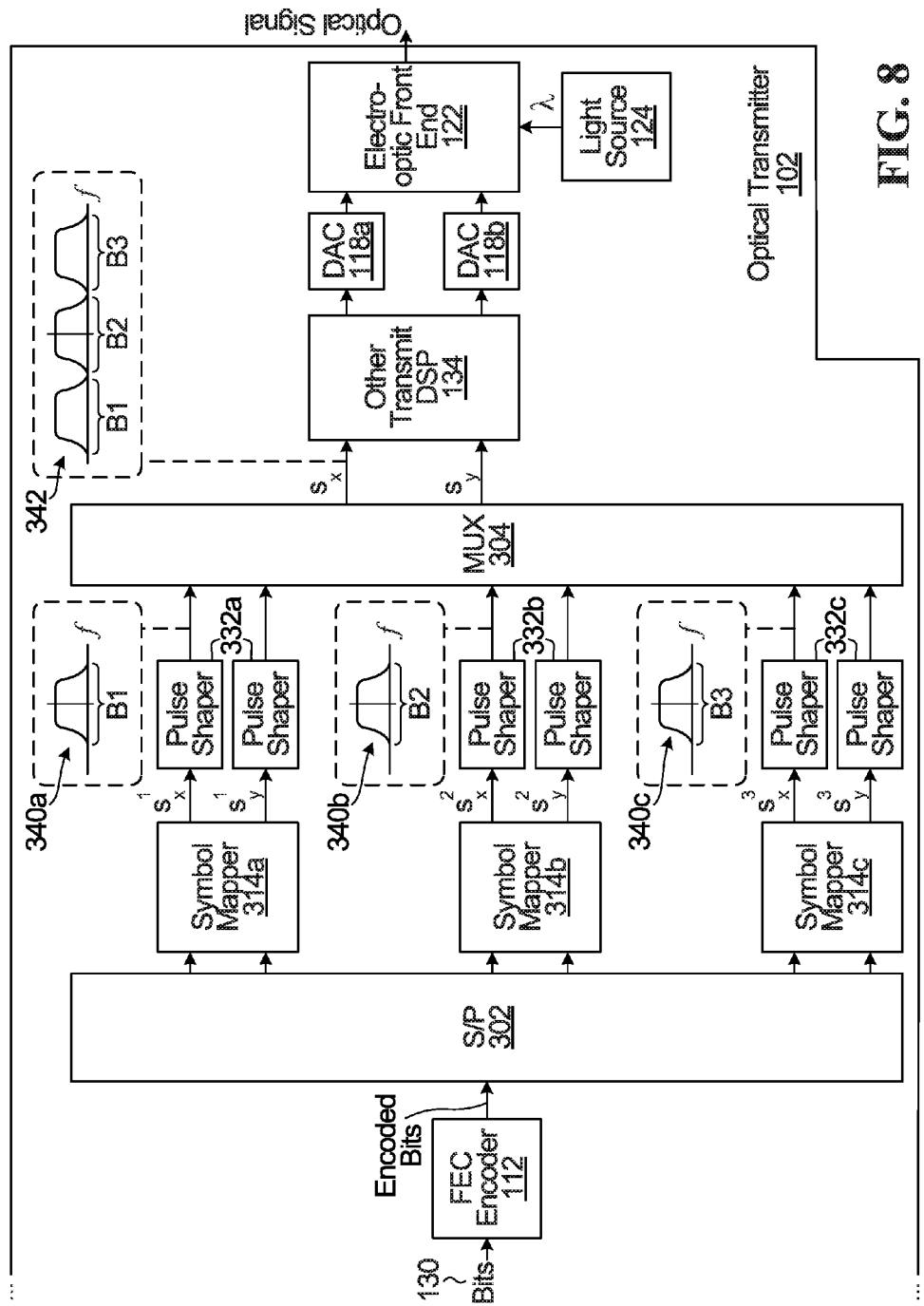
FIG. 8 is a block diagram of another example of an optical transmitter.

FIG. 8 is a block diagram of another example of the optical transmitter 102. The optical transmitter in FIG. 8 is a modification of the optical transmitter in FIG. 2. The components illustrated in FIG. 8 that have already been illustrated and described in relation to FIG. 2 will be designated using the same reference numerals and will not be described again. The FIG. 8 transmitter includes the FEC encoder 112 for encoding bits 130, as well as the other transmit digital signal processing 134, the DACs 118a and 118b, the electro-optic front end 122, and the light source 124 described earlier in relation to FIG. 2. However, instead of a single symbol mapper 114 and pulse shaping 132 in FIG. 2, the optical transmitter 102 of FIG. 8 includes a serial-to-parallel converter 302, a multiplexer 304, and three symbol mappers 314a, 314b, and 314c, each associated with respective pulse shapers 332a, 332b, and 332c. The symbol mappers 314a-c and pulse shapers 332a-c may each be implemented by a processor that executes instructions that cause the processor to perform the operations of the symbol mappers 314a-c and pulse shapers 332a-c. The same or different processor may be used to implement each of the symbol mappers 314a-c and pulse shapers 332a-c. Alternatively, the symbol mappers 314a-c and pulse shapers 332a-c may be implemented using dedicated integrated circuitry, such as an ASIC, a GPU, or an FPGA for performing the functions of the symbol mappers 314a-c and pulse shapers 332a-c. The pulse shapers 332a-c may be implemented in a digital signal processor that is also used to perform the other transmit digital signal processing 134.

During operation, the serial stream of encoded bits output from the FEC encoder 112 are processed by serial-to-parallel converter 302 to output three pairs of bit streams. Each one of the three pairs of bit streams is input into a respective one of the symbol mappers 314a-c. Symbol mapper 314a modulates each bit stream of the first pair of bit streams to result in data signal $S_x^1$ and $S_y^1$. The data signal $S_x^1$ is a symbol stream to be transmitted on a first polarization of an optical signal, and the data signal $S_y^1$ is a symbol stream to be transmitted on a second polarization of the optical signal. The data signals $S_x^1$ and $S_y^1$ then each undergo pulse shaping using an associated pulse shaping filter in pulse shapers 332a. Similarly, symbol mapper 314b modulates each bit stream of the second pair of bit streams onto a respective data signal $S_x^2$ and $S_y^2$. The data signals $S_x^2$ and $S_y^2$ then each undergo pulse shaping using an associated pulse shaping filter in pulse shapers 332b. Similarly, symbol mapper 314c modulates each bit stream of the third pair of bit streams onto a respective data signal $S_x^3$ and $S_y^3$. The data signals $S_x^3$ and $S_y^3$ then each undergo pulse shaping using an associated pulse shaping filter in pulse shapers 332c. The data signals $S_x^1$, $S_x^2$, and $S_x^3$ from each of the pulse shapers 332a-c are then multiplexed together by multiplexer 304 to form data signal $S_x$, and the data signals $S_y^1$, $S_y^2$, and $S_y^3$ from each of the pulse shapers 332a-c are then multiplexed together by multiplexer 304 to form data signal $S_y$.

The frequency spectrum of data signal $S_x^1$, after pulse shaping 332a, is illustrated at 340a. The frequency spectrum 340a is a single constituent band B1 of the overall transmitted signal. The frequency spectrum of data signal $S_x^2$, after pulse shaping 332b, is illustrated at 340b. The frequency spectrum 340b is also a single constituent band B2 of the overall transmitted signal. The frequency spectrum of data signal $S_x^3$, after pulse shaping 332c, is illustrated at 340c. The frequency spectrum 340c is also a single constituent band B3 of the overall transmitted signal.

The multiplexer 304 frequency shifts outer bands B1 and B3 in opposite directions and by equal amounts of shift to result in the multi-band signal in the digital domain/frequency spectrum of data signal $S_x$ illustrated at 342.

Although not illustrated, the multiplexer 304 further includes an IFFT block to "stitch" the three bands together to form the equivalent single-band time domain signal.

The partition of the encoded bits into three bit stream pairs implies that the data rate of each one of symbol mappers 314a-c can be reduced by a third compared to a single band transmission, which means a reduced bandwidth of each of bands B1, B2, and B3. The three bands multiplexed together, as shown at 342, results in a total bandwidth similar to an equivalent single band single carrier scenario in which only one symbol mapper is used, e.g. band 140 illustrated in FIG. 2. The baud rate of each one of the bands B1 to B3 in baseband is reduced by ⅓ compared to that of a single band single carrier transmission. For example, the baud rate $f_{B2}$ of inner band B2 is ⅓ the baud rate $f_B$ of the single band 140 illustrated in FIG. 2.

The frequency spectrum for $S_{y'}^1$, $S_{y'}^2$, $S_{y'}^3$, and $S_{y'}$ is not illustrated, but a similar discussion applies.

Figure 9:
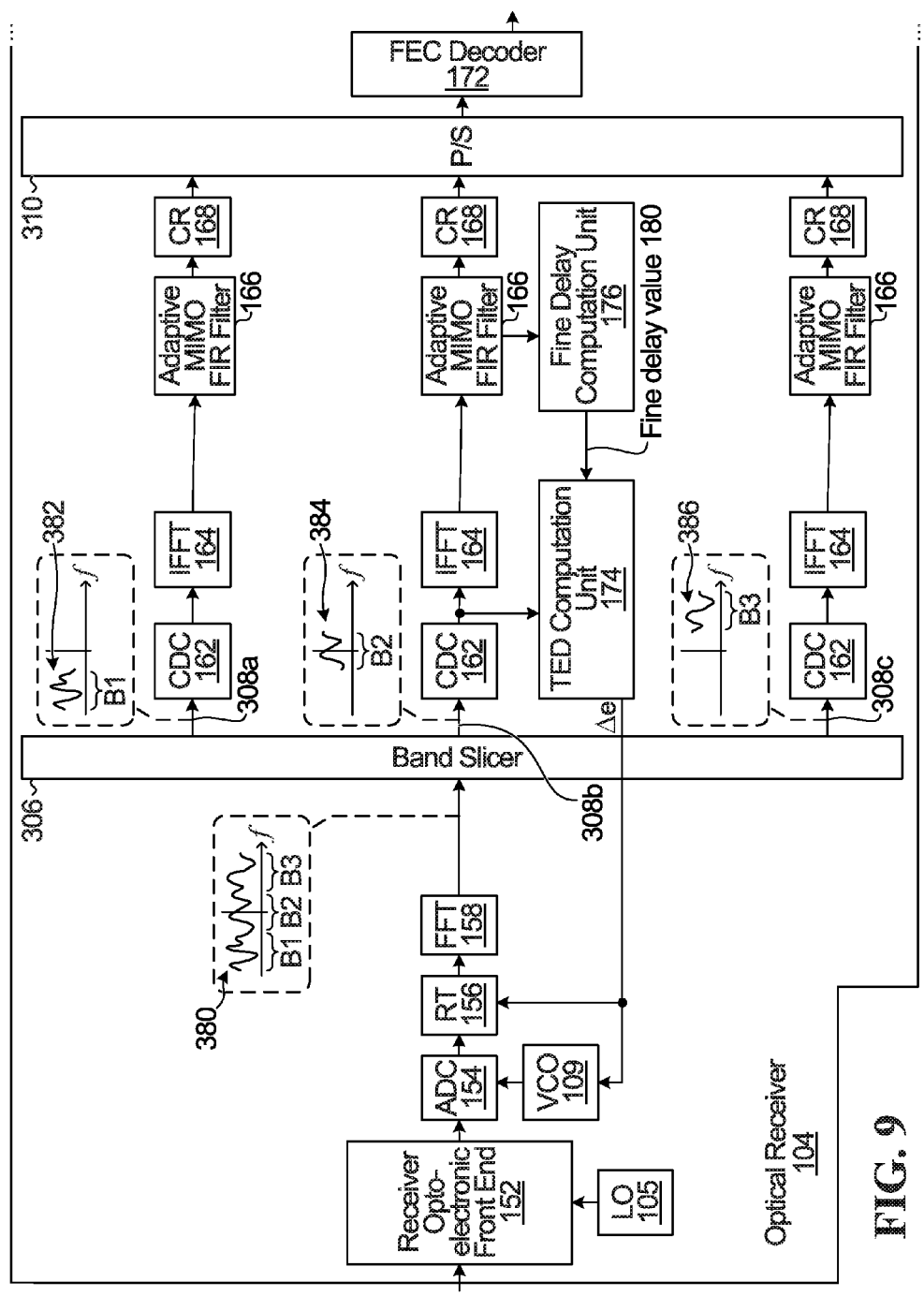
FIG. 9 is a block diagram of another example of an optical receiver.

FIG. 9 is a block diagram of an example of optical receiver 104 that corresponds to the optical transmitter of FIG. 8. The optical receiver in FIG. 9 is a modification of the optical receiver in FIG. 6. The components illustrated in FIG. 9 that have already been illustrated and described in relation to FIGS. 3 and 6 will be designated using the same reference numerals and will not be described again. The FIG. 9 receiver includes the opto-electronic front end 152, ADC 154, RT 156, FFT block 158, and FEC decoder 172 described earlier in relation to FIGS. 3 and 6. The compact representation introduced in FIG. 6 is being used in FIG. 9. Therefore, for example, even though a single "ADC 154" is mentioned and illustrated, it is actually four ADCs 154a-d, as shown in FIG. 3, one corresponding to each of the four components of the received signal.

The optical receiver 104 of FIG. 9 includes a band slicer 306 inserted after the FFT block 158. The band slicer 306 may also be called a demultiplexer. The band slicer 306 separates the received signal into the three bands B1, B2, and B3. The band slicer 306 may be implemented using three frequency-domain filters. Each one of the three frequency-domain filters, filters a respective one of the bands B1 to B3 from the input signal and acts as an ideal bandpass filter for each of the bands. Three branches 308a-c follow the band slicer 306. Each branch 308a-c includes the CDC 162, IFFT block 164, adaptive MIMO FIR filter 166, and CR block 168 described earlier in relation to FIGS. 3 and 6. Therefore, the functionality of these modules will not be described again, and the same reference numerals have been used as in FIG. 6. The optical receiver 104 of FIG. 9 further includes a parallel-to-serial converter 310 between the CR blocks 168 and the FEC decoder 172.

During operation, the received signal, after FFT block 158, is separated by the band slicer 306 into three signals: one signal corresponding to band B1 of the received signal, a second signal corresponding to band B2 of the received signal, and a third signal corresponding to band B3 of the received signal. The first signal corresponding to B1 is processed in branch 308a, the second signal corresponding to B2 is processed in branch 308b, and the third signal corresponding to B3 is processed in branch 308c. The output of the CR block 168 from each of branches 308a to 308c is converted into a serial stream by parallel-to-serial converter 310, and sent to FEC decoder 172.

The frequency spectrum of the received signal, having impairments from the optical channel, is illustrated at 380. The frequency spectrum of the first signal corresponding to B1, after band slicer 306, is illustrated at 382. Similarly, the frequency spectrum of the second signal corresponding to B2 is illustrated at 384, and the frequency spectrum of the third signal corresponding to B3 is illustrated at 386.

The TED computation unit 174 and fine delay computation unit 176 described earlier in relation to FIGS. 3 to 6 are only included in the middle branch 308b. That is, timing error detection is only performed using the signal transmitted on the inner band B2. Therefore, a timing error value Δe computed based on the inner band is used to adjust the timing offset in the RT 156.

Figure 10:
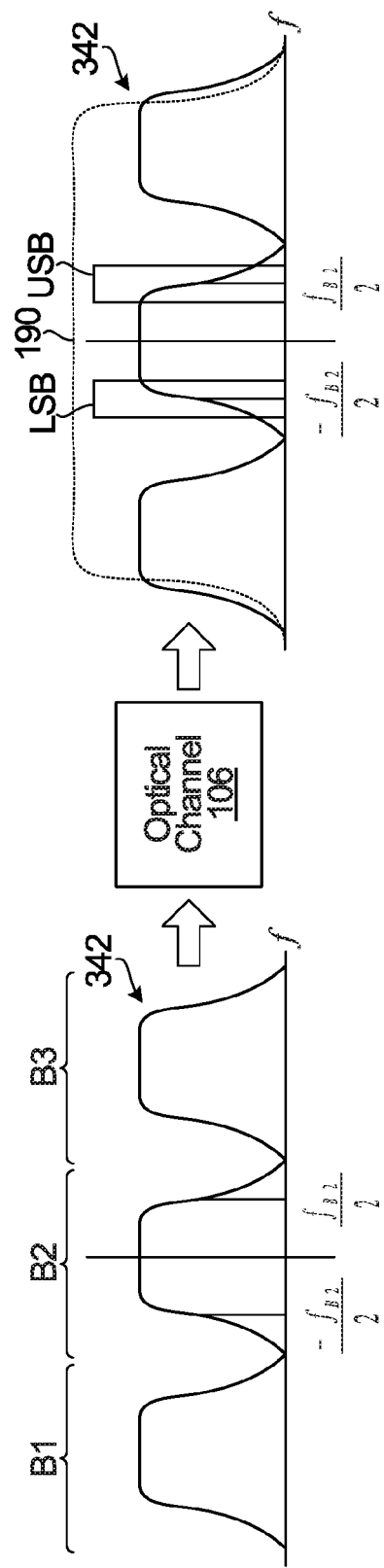
FIG. 10 illustrates the effect of a narrow filter on the frequency band of the multi-band signal transmitted and received in FIGS. 8 and 9.

By performing the timing error detection using only the inner band B2, the timing error detection method may be better isolated from the effects of the narrow filtering in the optical channel. FIG. 10 illustrates the effect of a narrow filter on the frequency band of the multi-band signal transmitted and received in the embodiments of FIGS. 8 and 9. On the left side of FIG. 10, the frequency spectrum 342 of data signal $S_x$ in the transmitter 102 is illustrated. This is the same frequency spectrum 342 illustrated and described above in relation to FIG. 8. The right side of FIG. 10 illustrates the effect of a narrow filter on the frequency spectrum 342. The frequency spectrum of the narrow filter is shown using stippled lines at 190. The frequency spectrum of the USB and LSB filters applied to the inner band during the Godard timing error detection method are also illustrated. The frequencies filtered by the USB and LSB filters do not include those significantly attenuated by the narrow filter because the Godard timing error detection method is performed on only the inner band. The narrow filtering may significantly attenuate or cut the outer bands B1 and B3 of the data signal, but does not affect the inner bands as much. The timing error detection is therefore better isolated from the effects of the narrow filtering.

Only a single inner band is used in the examples described above in relation to FIGS. 8 to 10. More generally, any number of inner bands may be used. A "inner band" refers to any band that is not the two outer bands. The two outer bands are the two outer most bands, i.e. the two bands having the non-zero signal content at the highest frequency separation from the center frequency, and the two bands between which the inner bands are interposed.

Figure 11:
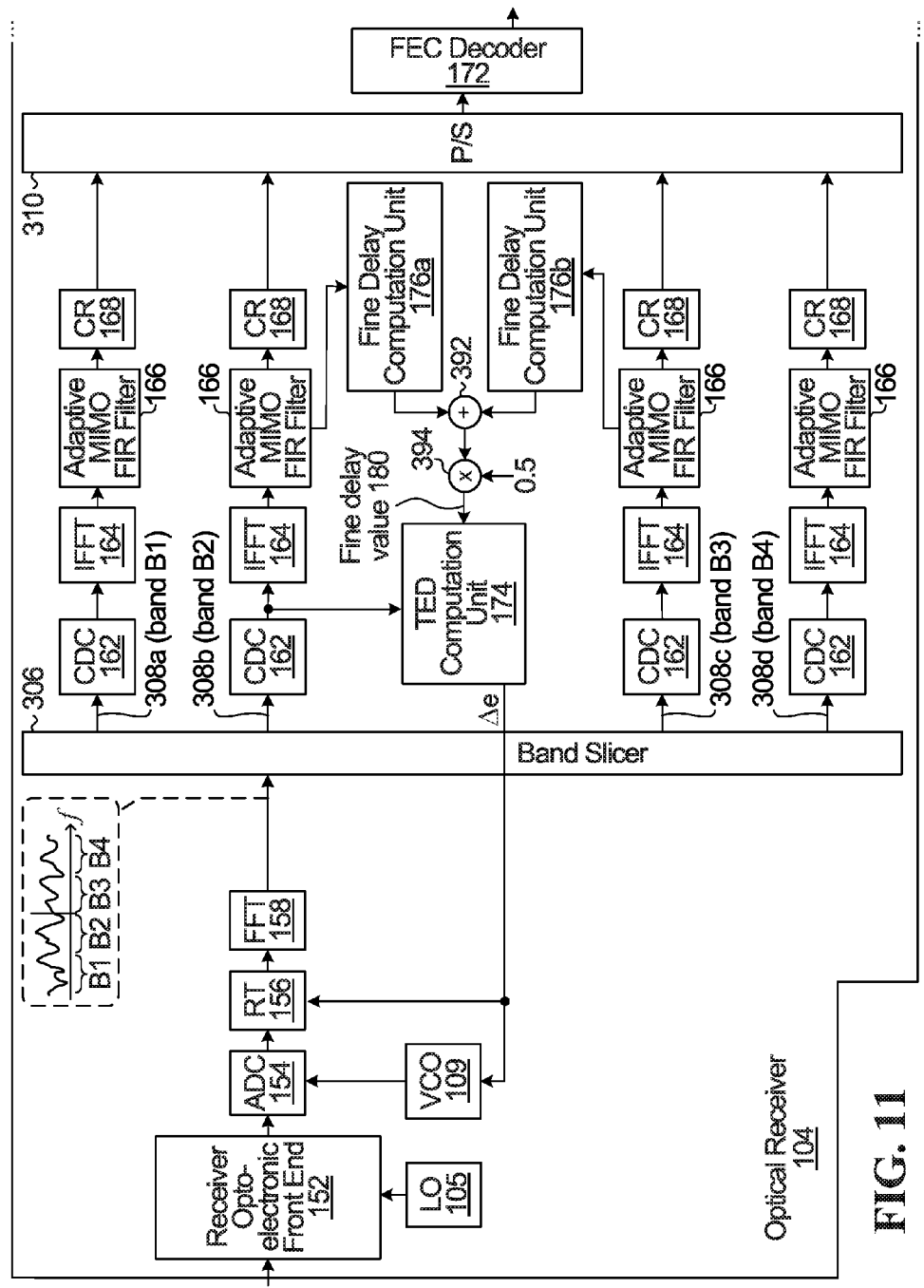
FIG. 11 is a block diagram of another example of an optical receiver.

FIG. 11 is a block diagram of one example of the optical receiver 104 in which the optical receiver 104 is configured to receive an optical signal carrying a data signal having four bands: B1, B2, B3, and B4. Bands B1 and B4 are the outer bands, and bands B2 and B3 are the inner bands. The components in FIG. 11 described earlier have been designated using the same reference numeral, and these components will not be described again. In FIG. 11, the band slicer 306 instead separates the received signal into four signals: each one corresponding to a respective one of bands B1 to B4. In the embodiment in FIG. 11, the timing error detection is performed using the received signal corresponding to band B2. Alternatively, the timing error detection may instead be performed using the received signal corresponding to B3. Both B2 and B3 are inner bands that are better isolated from the effects of narrow filtering, and so either band may be used.

When there is an even number of inner bands, as in FIG. 11, the fine delay value 180 input into TED computation unit 174 may be an average of fine delay values computed using two inner band signals. Therefore, FIG. 11 includes two fine delay computation units 176a and 176b, both of which operate in the same manner as computation unit 176 descried earlier. Fine delay computation unit 176a computes a fine delay value based on the tap coefficients of the MIMO FIR filter that processes the signal corresponding to band B2 of the received signal. Fine delay computation unit 176b computes a fine delay value based on the tap coefficients of the MIMO FIR filter that processes the signal corresponding to band B3 of the received signal. An average of the output of fine delay computation units 176a and 176b is computed and used as fine delay value 180. Computation of the average is illustrated in FIG. 11 using adder 392 and multiplier 394. The output of fine delay computation unit 176a is added to the output of fine delay computation unit 176b via the adder 392, and the result is multiplied by 0.5 via the multiplier 394 in order to result in fine delay value 180. In some embodiments, the fine delay value 180 may be further multiplied by a step-size constant before being used.

The delay introduced into the transmitted signal is the same for all bands for all channel impairments, except for chromatic dispersion. Because the received signal is separated into the different bands by band slicer 306, the CDC 162 performs chromatic dispersion compensation separately on each band. The delay experienced by each band varies due to the separate chromatic dispersion compensation. For example, the delay experienced by Band 1 may be 2.7 symbols, and the delay experienced by Band 2 may be 1.5 symbols. The delay experienced by a band may be denoted using the notation K.A symbols, where K is the rational part of the delay (e.g. K=2 symbols) and A is the fractional part of the symbols (e.g. A=0.7 symbols). The rational part of the delay in each band may be compensated for in a framing module. The fractional part of the delay is called the residual delay, and the residual delay is compensated by the adaptive MIMO FIR filter 166 corresponding to the band.

The residual delay experienced at each band due to independent CDC per band can be expressed as $[-A_{m/2}, \ldots, -A_1, \ldots, A_1, \ldots, A_{m/2}]$ (m even), where m is the total number of bands. There is symmetry in the residual delay values. For example, if there are four bands, as in the FIG. 11 embodiment, then m=4 and the residual delay of Band 1 is $-A_2$, the residual delay of Band 2 is $-A_1$, the residual delay of Band 3 is $A_1$, and the residual delay of Band 4 is $A_2$. Considering a fixed residual delay C due to other impairments besides chromatic dispersion, the residual delay at each band can be expressed as $[C-A_{m/2}, \ldots, C-A_1, C+A_1, \ldots, C+A_{m/2}]$. Using two inner bands, or a group of pair of inner bands, and averaging their unwrapped residual delay from FIR tap coefficients, the value C may be recovered because the residual delay values are symmetric. For example, in the FIG. 11 embodiment, by taking the average of the output of fine delay computation units 176a and 176b, the different and opposite symbol delays introduced into bands B2 and B3 are cancelled out due to the symmetry: $((C-A_1)+(C+A_1))\times 0.5=C$. As another example, if the total number of bands were instead eight (B1 to B8), then the average of the fine delay computation unit outputs for the four inner bands (B3 to B6) may be used. When the number of bands is odd, e.g. as in the FIG. 9 embodiment, then the inner middle band may be used to compute the fine delay value, as shown in FIG. 9. Alternatively, for an odd number of bands, a fine delay value may be computed by averaging over equidistant even number of constituent bands.

Possible advantages of embodiments described above may include the following. Multiple bands may be employed in a single carrier channel such that at least one band is better isolated from narrow filtering in the optical channel. Timing errors are calculated based on one or multiple inner bands. Therefore, the multiple bands may secure at least one band against filtering effects because the timing error may be calculated based on at least one band that is undistorted (or not distorted as much) by a narrow filter in the optical channel. The second stage timing error may be based on a group of pair of bands. Modifications required to transmit/receive multiple bands, instead of a single band, may be considered low complexity. A change in the implementation of a TED computation unit is not necessitated by use of multiple digital bands for signal transmission. The embodiments may be considered as providing robust clock recovery in the presence of band-limited and/or non-linear components and channel impairments. The embodiments may have wide applicability irrespective of data-rate and modulation format. In future high capacity channels, large data-rates will not only be achieved by high order modulation formats, but also by enlarging the bandwidth. As a result, narrow filtering in the optical channel may have more of an effect on higher frequencies. Also, in current fixed grid networks, channels with large bandwidth are affected by narrow filtering. In both cases, using multiple bands, as described above, may mitigate the effects of the narrow filtering on clock recovery.

Also, using multiple bands, as described above, may allow for a reduction in the roll-off factor for pulse shaping filters in the transmitter. For example, the roll off factor for the inner band used for computing the timing error detection may be reduced to a smaller value (e.g. 0.05), and the roll-off factor for the outer bands, and any inner bands not used for computing the timing error detection, may be reduced to as low as zero. More generally, any arbitrary pulse shaping may be used for the outer bands, and for any inner bands not used for computing the timing error value, in order to shrink the bandwidth and be more tolerable to narrow filters.

Figure 12:
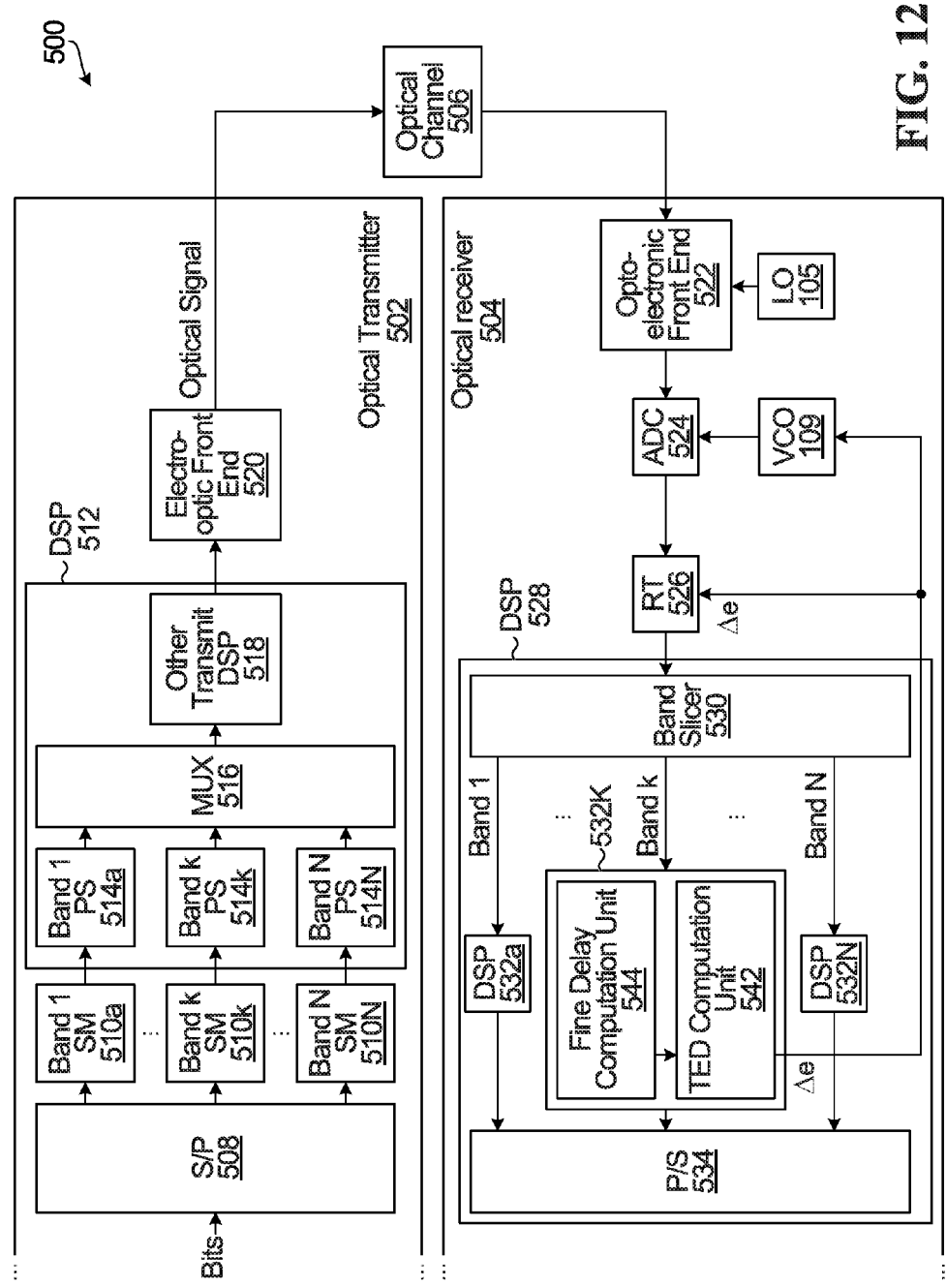
FIG. 12 is a block diagram of a coherent optical communication system, according to another embodiment.

FIG. 12 is a block diagram of a coherent optical communication system 500, according to another embodiment. The coherent optical communication system 500 is shown more generally. Other components may be present in actual implementation, but have been omitted for the sake of clarity. The coherent optical communication system 500 includes an optical transmitter 502 and an optical receiver 504, connected by an optical channel 506.

The optical transmitter 502 includes a serial-to-parallel converter 508, N symbol mappers 510a to 510N, and a digital signal processor 512. The digital signal processor 512 implements pulse shapers 514a to 514N, a multiplexer 516, and other transmit digital signal processing 518. The optical transmitter 502 further includes an electro-optic front end 520. The symbol mappers 510a to 510N and the digital signal processor 512 may each be implemented by a processor that executes instructions that cause the processor to perform the operations of the symbol mappers 510a to 510N and the digital signal processor 512. Alternatively, symbol mappers 510a to 510N and the digital signal processor 512 may be implemented using dedicated integrated circuitry, such as an ASIC, GPU, or FPGA for performing the functions of the symbol mappers 510a to 510N and the digital signal processor 512. The electro-optic front end 520 may be implemented using a linear driver, a Mach-Zehnder modulator, and an external laser source.

The optical transmitter in FIG. 8 is an example of optical transmitter 502 for N=3.

The optical receiver 504 includes an opto-electronic front end 522, an ADC 524, a digital retiming module (RT) 526, and a digital signal processor 528. The digital signal processor 528 implements a band slicer 530, digital signal processing 532a to 532N, and a parallel to serial converter 534. Opto-electronic front end 522 may be implemented using two 90-degree optical hybrids, followed by photo diodes implementing a photo detector to convert the received optical signal into an electrical signal. One specific example of an opto-electronic front end is illustrated and described earlier in relation to FIG. 4. The ADC 524 may act as a sampler that periodically samples its input analog electrical signal. In some embodiments, a comparator may be used to implement the ADC 524. The RT 526 may comprise a buffer that stores the received digital data samples and an interpolator that that provides at its output the sampled data at the appropriately adjusted sampling instant based on the timing error value. The digital signal processor 528 may be implemented by a processor that executes instructions that cause the processor to perform the operations of the digital signal processor 528. Alternatively, the digital signal processor 528 may be implemented using dedicated integrated circuitry, such as an ASIC, a GPU, or an FPGA for performing the functions of the digital signal processor 528.

The optical receiver in FIG. 9 is an example of optical receiver 504 for N=3, and the optical receiver in FIG. 11 is an example of optical receiver 504 for N=4.

During operation, bits in the transmitter 502, which may be encoded, are demultiplexed into N bit streams. Each one of the N bit streams is modulated using a respective symbol mapper (SM) 510a to 510N and then pulse shaped by a respective pulse shaper 514a to 514N. Each modulated data signal has a respective frequency band B1 to BN. The modulated data signals are multiplexed together by multiplexer 516 to result in a multi-band signal having N bands. An example of such a multi-band signal for N=3 is shown in FIG. 8 at 342. The multi-band signal may undergo further processing, e.g. digital signal processing at 518, and is ultimately modulated onto a single carrier optical signal by electro-optic front end 520. The single optical carrier carrying the multi-band data signal is possibly multiplexed with other optical carriers (not shown) and then transmitted through optical channel 506 and received at the optical receiver 504. The received single optical carrier signal is converted to the electrical domain by opto-electronic front end 522 to obtain a received multi-band signal, and analog-to-digital conversion and then re-timing is performed by ADC 524 and RT 526. The re-timed signal then undergoes digital signal processing in digital signal processor 528. The digital signal processing includes slicing the signal into N signals, each one of the N signals corresponding to a respective one of the N multi-bands. Digital signal processing is performed on each one of the N signals, as at 532a to 532N. Timing error detection is performed using an inner band k. The outer bands 1 and N are not used to perform timing error detection. The timing error detection is implemented by a TED computation unit 542 in the digital signal processing 532k of the digital signal processor 528. The output of the TED computation unit 542 is a timing error value Δe. The timing error value Δe is used to adjust the frequency of the VCO 109, and/or the timing error value Δe is used by the RT 526 to correct timing offset. Optionally, a fine delay computation is also performed using filter taps of a filter used to process inner band k. The fine delay computation is implemented by a fine delay computation unit 544 in the digital signal processing 532k. Although not shown, another fine delay computation may also be performed using filter taps of at least one other filter used to process another inner band i, where 1<i<N, i≠k, and i is chosen such that inner band i and inner band k are symmetric. The average of the fine delay values are then averaged and used as the input to the TED computation unit 542, as described earlier with respect to FIG. 11.

Figure 13:
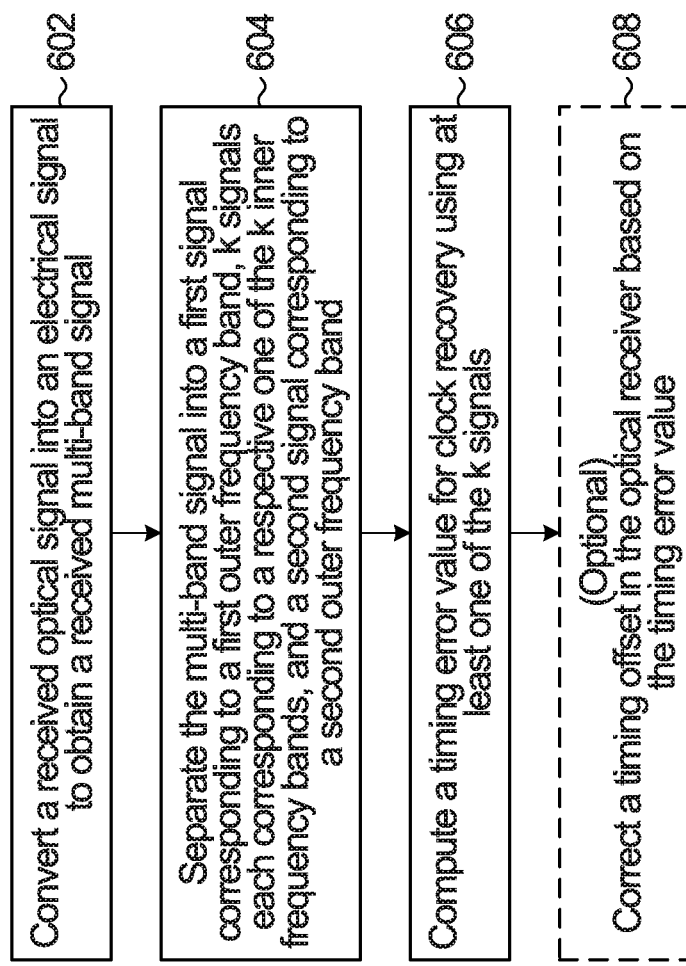
FIG. 13 is a flowchart of a method performed by an optical receiver, according to one embodiment.

FIG. 13 is a flowchart of a method performed by the optical receiver 504, according to one embodiment. In step 602, a received single carrier optical signal is converted into an electrical signal, e.g. by opto-electronic front end 522, to obtain a received multi-band signal. The single carrier optical signal carries the multi-band signal, and the single carrier optical signal may have been multiplexed and received with other single carrier optical signals.

The received multi-band signal has a plurality of frequency bands, including k≥1 inner frequency bands interposed between a first outer frequency band and a second outer frequency band. k is an integer.

In step 604, the received multi-band signal is separated, e.g. by band slicer 530, into a plurality of signals. The plurality of signals include a first signal corresponding to the first outer frequency band, k signals each corresponding to a respective one of the k inner frequency bands, and a second signal corresponding to the second outer frequency band.

In step 606, a timing error value for clock recovery is computed by using at least one of the k signals.

Optionally, in step 608, the timing error value is used to correct a timing offset in the receiver. For example, the timing error value may be used by RT 526 to correct a timing offset.

In some embodiments, step 606 may further include computing the timing error value by not using the first signal or the second signal. In this way, the timing error detection may be better isolated from the effects of narrow filtering in the optical channel 506.

In some embodiments, the method of FIG. 13 may further include performing chromatic dispersion compensation on a particular signal of the k signals to obtain a dispersion compensated signal. Step 606 may then include computing the timing error value using the dispersion compensated signal. For example, in the embodiments illustrated in FIGS. 9 and 11, the timing error detection uses, as an input, the output of a chromatic dispersion compensator. In some embodiments, the timing error value may be computed using the Godard method.

In some embodiments, the method of FIG. 13 may further include filtering the dispersion compensated signal with a filter, e.g. a filter for performing PMD compensation. The filter may be adaptive. The method may further include computing a fine delay value based on taps of the filter, and then computing the timing error value in step 606 using the fine delay value. For example, in the embodiments illustrated in FIGS. 9 and 11, the timing error detection also uses a fine delay value computed based on taps of one or more adaptive filters. Although in these embodiments the dispersion compensated signal is filtered, there may be other processing of the dispersion compensated signal prior to the filtering. For example, in FIG. 9 the output of the CDC 162 is a dispersion compensated signal, but the dispersion compensated signal undergoes IFFT 164 before being filtered by filter 166. Other processing may occur between CDC 162 and filter 166.

In some embodiments, computing the timing error value in step 606 includes computing an initial value using the dispersion compensated signal, and then adjusting the initial value by the fine delay value in order to obtain the timing error value. The adjustment may be an addition or subtraction of the fine delay value to/from the initial value. One example is illustrated at 238 in FIG. 5.

In some embodiments, k is an even number, the dispersion compensated signal is a first dispersion compensated signal, the filter is a first filter, the fine delay value is a first fine delay value, and the method further includes performing chromatic dispersion compensation on another signal of the k signals to obtain a second dispersion compensated signal.

The other signal of the k signals is different from the particular signal. The method further includes filtering the second dispersion compensated signal with a second filter (which may be an adaptive filter and may be used for PMD compensation). The method further includes computing a second fine delay value based on taps of the second filter, and further using the second fine delay value to compute the timing error value in step 606. An example is shown in FIG. 11 in which there are two fine delay computation units 176a and 176b. In some embodiments, as in FIG. 11, the method may include averaging the first fine delay value and the second fine delay value to obtain an average fine delay value, and then computing the timing error value using the average fine delay value.

In some embodiments, the received multi-band signal corresponds to a transmitted multi-band signal having the transmitted symbols for each frequency band pulse-shaped. A pulse-shaping filter used to pulse-shape an outer frequency band signal may have a roll-off factor smaller than a roll-off factor of another pulse-shaping filter used to pulse shape an inner frequency band. For example, the roll-off factor of a pulse-shaping filter for an outer band may be close to (or equal to) zero, and the roll-off factor of a pulse-shaping filter for an inner band may be close to (or equal to) 0.05.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method performed at an optical receiver comprising:
converting a received optical signal on a single optical carrier into an electrical signal to obtain a received multi-band signal, the received multi-band signal having a plurality of frequency bands comprising $k \geq 1$ inner frequency bands interposed between a first outer frequency band and a second outer frequency band;
separating the received multi-band signal into a plurality of signals, the plurality of signals including a first signal corresponding to the first outer frequency band, k signals each corresponding to a respective one of the k inner frequency bands, and a second signal corresponding to the second outer frequency band; and
computing a timing error value for use in clock recovery by using at least one of the k signals without using the first signal or the second signal.

2. The method of claim 1, further comprising:
performing chromatic dispersion compensation on a particular signal of the k signals to obtain a dispersion compensated signal; and
computing the timing error value using the dispersion compensated signal.

3. The method of claim 2, further comprising:
computing the timing error value using a Godard method.

4. The method of claim 3, further comprising:
computing a fine delay value based on taps of a filter in the receiver; and
computing the timing error value using the fine delay value.

5. The method of claim 4, wherein the filter is for performing polarization mode dispersion compensation.

6. The method of claim 4, wherein the computing the timing error value comprises:
computing an initial value using the dispersion compensated signal; and
adjusting the initial value by the fine delay value in order to obtain the timing error value.

7. The method of claim 4, wherein the dispersion compensated signal is a first dispersion compensated signal, wherein the filter is a first filter, wherein the fine delay value is a first fine delay value, and wherein the method further comprises:
performing chromatic dispersion compensation on another signal of the k signals to obtain a second dispersion compensated signal, wherein the another signal of the k signals is different from the particular signal;
filtering the second dispersion compensated signal with a second filter to perform polarization mode dispersion compensation;
computing a second fine delay value based on taps of the second filter; and
further using the second fine delay value to compute the timing error value.

8. The method of claim 7, comprising:
averaging the first fine delay value and the second fine delay value to obtain an average fine delay value; and computing the timing error value using the average fine delay value.

9. The method of claim 1, further comprising:
correcting a timing offset based on the timing error value.

10. The method of claim 1, wherein the received multi-band signal corresponds to a transmitted multi-band signal having each frequency band pulse-shaped, wherein a pulse-shaping filter used to pulse-shape an outer frequency band signal has a roll-off factor smaller than a roll-off factor of another pulse-shaping filter used to pulse shape an inner frequency band.

11. An optical receiver comprising:
an opto-electronic front end to convert a received optical signal on a single optical carrier into an electrical signal to obtain a received multi-band signal, the received multi-band signal having a plurality of frequency bands comprising k≥1 inner frequency bands interposed between a first outer frequency band and a second outer frequency band;
a band slicer to separate the received multi-band signal into a plurality of signals, the plurality of signals including a first signal corresponding to the first outer frequency band, k signals each corresponding to a respective one of the k inner frequency bands, and a second signal corresponding to the second outer frequency band; and
a timing error detection computation unit to compute a timing error value for use in clock recovery by using at least one of the k signals without using the first signal or the second signal.

12. The optical receiver of claim 11, further comprising:
a chromatic dispersion compensator to perform chromatic dispersion compensation on a particular signal of the k signals to obtain a dispersion compensated signal;
wherein the timing error detection computation unit is to compute the timing error value using the dispersion compensated signal.

13. The optical receiver of claim 12, wherein the timing error detection computation unit is to compute the timing error value using a Godard method.

14. The optical receiver of claim 12, further comprising:
a fine delay computation unit to compute a fine delay value based on taps of a filter in the receiver;
wherein the timing error detection computation unit is to compute the timing error value using the fine delay value.

15. The optical receiver of claim 14, wherein the filter is for performing polarization mode dispersion compensation.

16. The optical receiver of claim 14, wherein the timing error detection computation unit is to compute the timing error value by:
computing an initial value using the dispersion compensated signal; and
adjusting the initial value by the fine delay value in order to obtain the timing error value.

17. The optical receiver of claim 14, wherein the chromatic dispersion compensator is a first chromatic dispersion compensator, wherein the dispersion compensated signal is a first dispersion compensated signal, wherein the filter is a first filter, wherein the fine delay computation unit is a first fine delay computation unit, wherein the fine delay value is a first fine delay value, and wherein the optical receiver further comprises:
a second chromatic dispersion compensator to perform chromatic dispersion compensation on another signal of the k signals to obtain a second dispersion compensated signal, wherein the another signal of the k signals is different from the particular signal;
a second filter to filter the second dispersion compensated signal to perform polarization mode dispersion compensation; and
a second fine delay computation unit to compute a second fine delay value based on taps of the second filter;
wherein the timing error detection computation unit is to compute the timing error value by also using the second fine delay value.

18. The optical receiver of claim 17, wherein the timing error detection computation unit is to:
average the first fine delay value and the second fine delay value to obtain an average fine delay value; and
compute the timing error value using the average fine delay value.

19. The optical receiver of claim 11, further comprising:
a retimer to correct a timing offset based on the timing error value.

20. The optical receiver of claim 11, wherein the received multi-band signal corresponds to a transmitted multi-band signal having each frequency band pulse-shaped, wherein a pulse-shaping filter used to pulse-shape an outer frequency band signal has a roll-off factor smaller than a roll-off factor of another pulse-shaping filter used to pulse shape an inner frequency band.

* * * * *